(12) United States Patent
George

(10) Patent No.: US 6,494,160 B2
(45) Date of Patent: Dec. 17, 2002

(54) RINGING KETTLE

(75) Inventor: Schmidt George, Douglaston, NY (US)

(73) Assignee: Kamenstein Corporation, Elmsford, NY (US)

( * ) Notice: Subject to any disclaimer, the term of this patent is extended or adjusted under 35 U.S.C. 154(b) by 39 days.

(21) Appl. No.: 09/758,588

(22) Filed: Jan. 11, 2001

(65) Prior Publication Data

US 2001/0029881 A1 Oct. 18, 2001

Related U.S. Application Data

(60) Provisional application No. 60/198,013, filed on Apr. 18, 2000.

(51) Int. Cl.[7] .................................................. G01Z 19/12
(52) U.S. Cl. .................. 116/70; 116/137 R; 220/573.1; 99/285
(58) Field of Search .......................... 116/67 R, 137 R, 116/142 FP, DIG. 7, 154, 143, 158, 70; 99/344, 285; 220/573.1, 912

(56) References Cited

U.S. PATENT DOCUMENTS

| | | | |
|---|---|---|---|
| 471,983 A | * 3/1892 | Rockwell | 116/158 |
| 622,440 A | * 4/1899 | Brandli | 116/158 |
| 1,692,518 A | * 11/1928 | Sotak, Jr. | 116/158 |
| 2,630,111 A | * 3/1953 | Zide | 126/388.1 |
| 4,102,294 A | * 7/1978 | Barber | 116/103 |
| 4,170,955 A | * 10/1979 | Zern | 116/137 R |
| 4,466,327 A | 8/1984 | Hinton | |
| 4,690,095 A | 9/1987 | Walls et al. | |
| 4,813,368 A | 3/1989 | Hutter III, et al. | |
| 5,265,522 A | * 11/1993 | Schultz | 340/584 |
| 5,950,862 A | 9/1999 | Haas et al. | |
| 6,102,240 A | 8/2000 | Haas et al. | |

\* cited by examiner

*Primary Examiner*—Christopher W. Fulton
*Assistant Examiner*—Tania Courson
(74) *Attorney, Agent, or Firm*—Robert A. Koons, Jr., Esq.; Karen C. Richardson, Esq.; Buchanan Ingersoll P.C.

(57) ABSTRACT

An apparatus for boiling a liquid includes an audible alarm for notifying an individual when the liquid is boiling. The audible alarm makes use of steam generated by the boiling liquid to drive a turbine which is connected to a means for ringing a bell to notify an individual that the liquid is boiling.

19 Claims, 4 Drawing Sheets

RINGING KETTLE

PRIORITY

This application claims priority to the provisional U.S. patent application entitled, Ringing Kettle, filed Apr. 18, 2000, having a Ser. No. 60/198,013.

FIELD OF THE INVENTION

The present invention relates generally to household vessels for boiling liquids. More particularly, the present invention relates to a method and apparatus for use with household vessels for boiling liquids, providing an audible notification to a user of when a is liquid boiling.

BACKGROUND OF THE INVENTION

There are many examples of household vessels that are used for boiling liquids. Further, it is generally known that steam generated by a boiling liquid, when subjected to pressurization and vented through a narrow aperture, will generate a whistling sound. It is known to use this characteristic in a household setting, such as a kitchen, to provide an audible means for notifying an individual when a liquid is boiling, as with a whistling tea kettle.

It is considered desirable to provide other means for providing an audible notification to an individual, of when a liquid in a household setting is boiling. Preferably the notification will take advantage of the pressure generated by steam from a boiling liquid and will provide an audible notification that is considered pleasant and or unique.

Accordingly, it is desirable to provide a method and apparatus for providing an audible notification to an individual in a household setting, of when a liquid is boiling.

SUMMARY OF THE INVENTION

It is therefore a feature and advantage of the present invention to provide a method and apparatus for providing an audible notification to an individual of when a liquid is boiling.

It is another feature and advantage of the present invention to provide an apparatus for boiling a liquid, which makes use of the novel method and apparatus for providing an audible notification of when a liquid is boiling.

The above and other features and advantages are achieved through the use of a novel steam driven alarm as herein disclosed. In accordance with one embodiment of the present invention, a steam driven alarm for a container for boiling a liquid to notify a user when the liquid boils is provided.

The alarm has a bell preferably having at least one detent thereon and defining a cavity on its' underside. The bell may further have at least one vent in its' surface for allowing steam to escape from the cavity defined by the bell. A steam driven turbine assembly is disposed proximate to the bell. The turbine assembly has at least one striking means for striking the bell. The turbine assembly is preferably comprised of a turbine sleeve, a turbine and the striking means. The turbine sleeve is substantially a cylinder and is supported coaxially on a pin and is freely rotatable around an axis of rotation defined by the pin. The turbine is affixed to the turbine sleeve such that steam admitted to the enclosed space causes the turbine and sleeve to rotate coaxially. The striking means is affixed to the turbine sleeve such that it rotates coaxially with the turbine and turbine sleeve.

The turbine itself is of a type well known in the art. A plurality of blades is provided, where the blades extend radially from an axis of rotation in a common plane that is perpendicular to the axis of rotation. The surface of each blade is angled such that a plane defined by the blade surface is at an angle to the axis of rotation that is less than 90°.

The striking means may preferably comprise a washer assembly having a plurality of arms which extend radially from the axis of rotation. The end of each arm, distal from the axis of rotation, has a post thereon which is substantially parallel to the axis of rotation, and a washer disposed on the post. The washer on each post is slidable in a plane perpendicular to the axis of rotation, such that when the turbine assembly rotates the washer is forced outward by centrifugal force and is restrained by the post. When the turbine assembly rotates, the washers are forced a sufficient distance outward such that as the washer assembly rotates, the washers strike the detent repeatedly, causing the bell to ring.

The steam driven alarm is in communication with an apparatus for boiling a liquid such that when a liquid in the apparatus boils, steam is communicated to the alarm, causing the turbine assembly to rotate and the striking means to strike the bell repeatedly. Thus an audible notification that the liquid is boiling is provided. Preferably, the striking means strikes a detent on the bell.

In accordance with another embodiment of the present invention, a vessel is provided which makes use of the novel steam driven alarm. In this embodiment, an enclosed space for housing the steam driven alarm is incorporated into the structure of an apparatus for boiling a liquid. In a preferred embodiment, the apparatus for boiling a liquid comprises a vessel for holding a liquid to be boiled and a lid. In a more preferred embodiment, the lid comprises an enclosed space for housing the steam driven alarm. In a most preferred embodiment, the apparatus for boiling a liquid is a kettle for boiling water.

There has thus been outlined, rather broadly, the more important features of the invention in order that the detailed description thereof that follows may be better understood, and in order that the present contribution to the art may be better appreciated. There are, of course, additional features of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein, as well as the abstract included below, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

DETAILED DESCRIPTION OF PREFERRED EMBODIMENTS OF THE INVENTION

Figure 1:
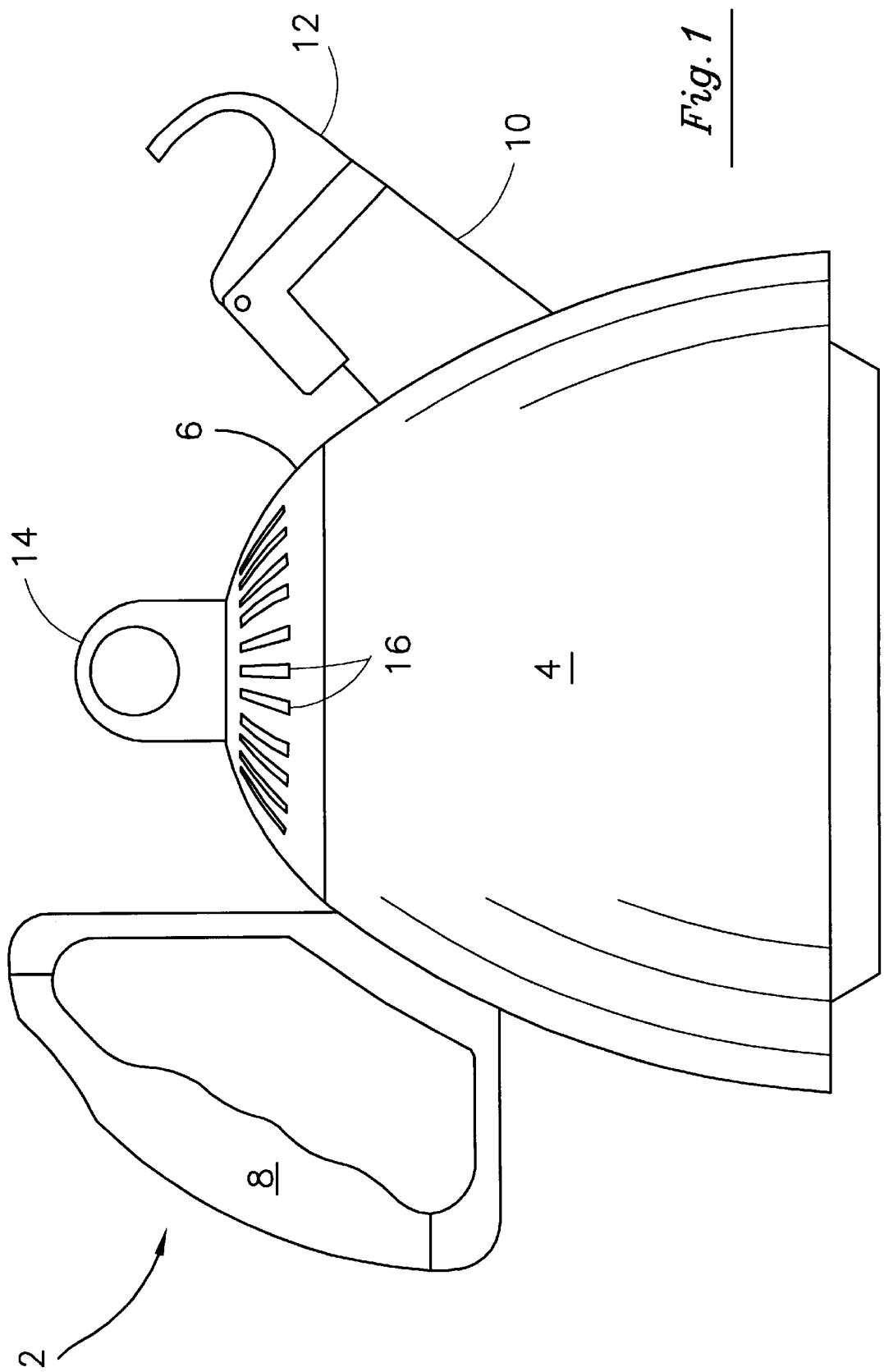
FIG. 1 illustrates an apparatus for boiling a liquid, incorporating a novel steam driven alarm according to the present invention.

An embodiment of an apparatus for boiling a liquid, incorporating a steam driven alarm is illustrated in FIG. 1. The apparatus 2 for boiling a liquid comprises a container 4 for containing a liquid to be boiled and a lid 6, which forms a pressure tight seal with the container 4. The container 4 is preferably equipped with a handle 8 for grasping and a spout 10 for dispensing a liquid. The spout 10 is further equipped with a cap 12 for preventing loss of steam pressure from the boiling liquid. The lid is preferably equipped with a handle 14 for grasping to remove the lid 6. The lid 6 is further equipped with a plurality of vents 16 for venting steam from a boiling liquid in the container 4.

Figure 2:
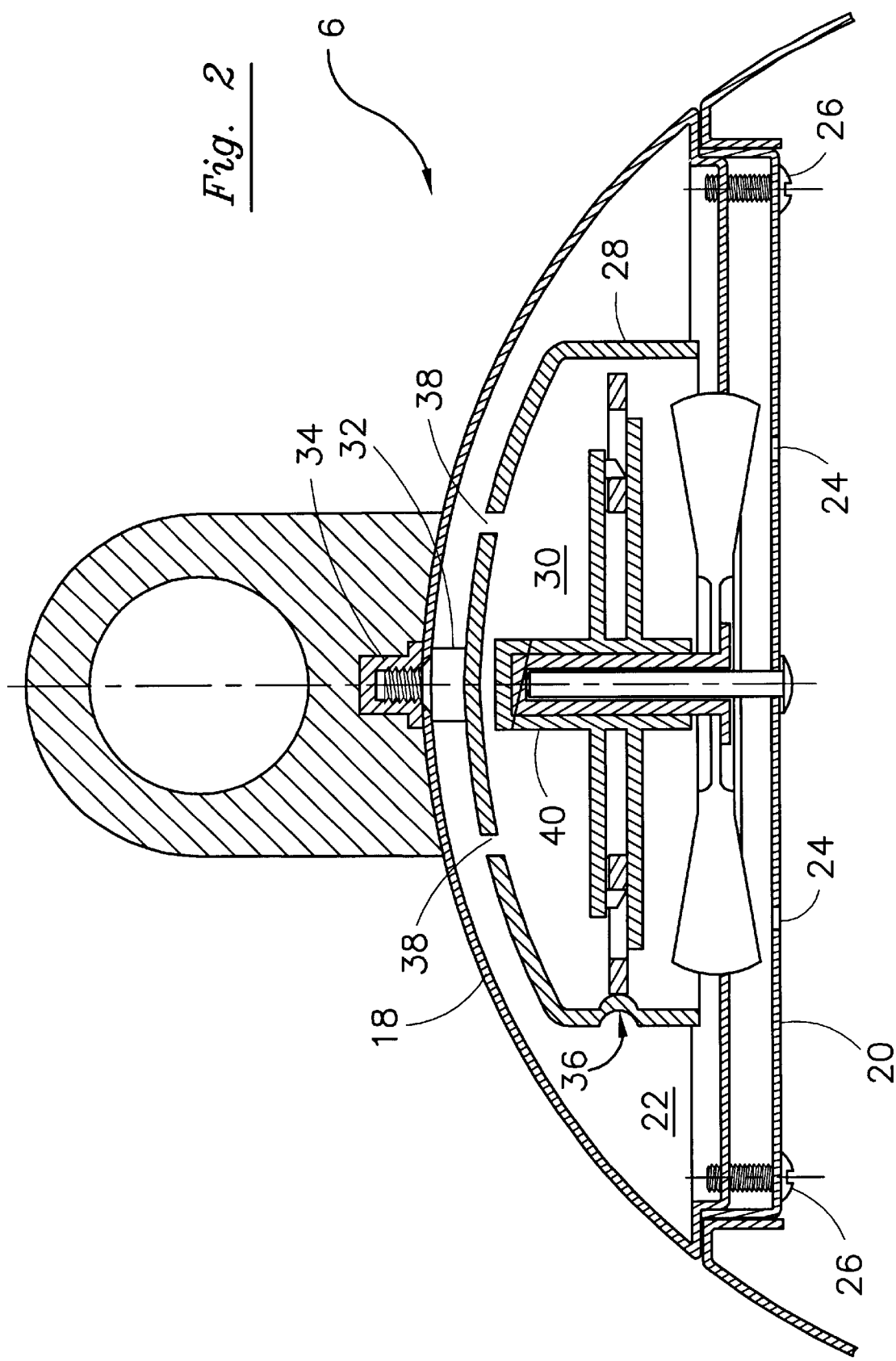
FIG. 2 illustrates a cross sectional view of a lid for an apparatus for boiling a liquid and incorporating a steam driven alarm according to the present invention.

Referring to FIG. 2, a cross section of a lid 6 according to a preferred embodiment is shown. The lid 6 is comprised of an upper half 18 and a lower half 20, that when assembled define and enclosed space 22. The lower half 20 has vents 24 therein for communicating steam from a boiling liquid in the container 4 to the enclosed space 22. In this preferred embodiment, the upper and lower halves 18 and 20 are secured together by bolts 26. It will be recognized by those skilled in the art that alternative means are possible to secure two halves together and that the present invention is not limited to the means shown here. It will be further recognized that a lid defining an enclosed space may be constructed of more than two assembled parts.

Still referring to FIG. 2, a bell 28 is disposed in the enclosed space 22 defined by the lid 6. The bell defines a cavity 30 and is further disposed over the vents 24 such that steam admitted to the enclosed space 22 is directed to the cavity 30. The bell 28 may preferably be secured to the roof of the lid 6 by attachment means 32 and 34. The bell includes at least one detent 36 and may preferably have vents 38 for venting steam from the cavity 30. A turbine assembly 40 is disposed in the cavity 30.

It will be recognized that it is possible to locate the steam driven alarm on an apparatus for boiling a liquid at places other than in the lid. It will be further recognized that a lid is not required for the apparatus for boiling a liquid. An embodiment that comprises a tightly sealed container, without a removable lid is considered to be within the scope of the invention.

Figure 3:
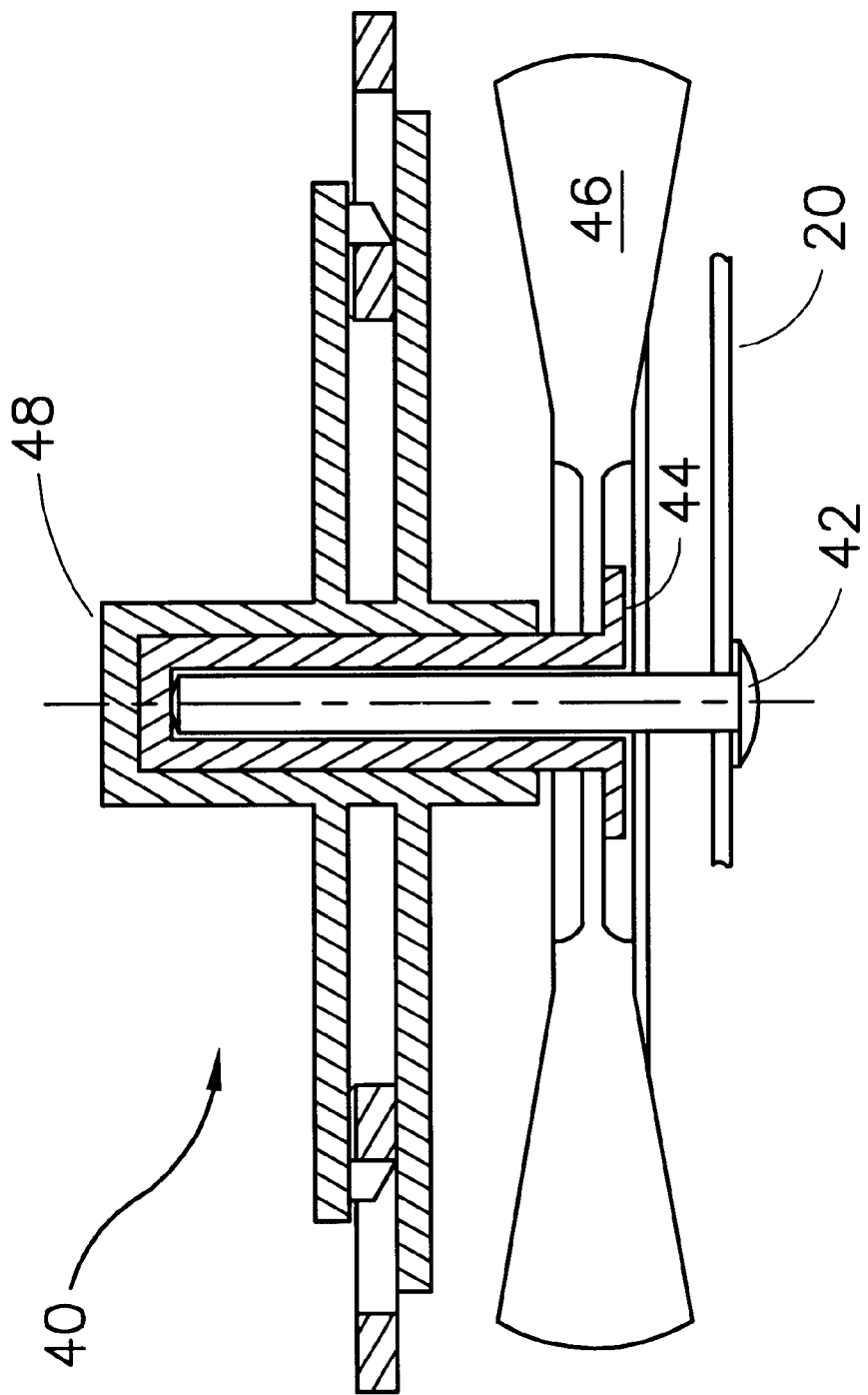
FIG. 3 illustrates a cross sectional view of a turbine assembly according to the present invention.

Referring to FIG. 3, the turbine assembly 40 according to a preferred embodiment is shown. A pin 42 is attached to the floor of the lower half 20 of the lid 6, defining an axis of rotation. A turbine sleeve 44 is mounted coaxially on the pin 42 such that it can rotate freely through 360°. A turbine 46 is affixed coaxially to the turbine sleeve 44. A washer assembly 48 is affixed to the turbine sleeve 44 such that it rotates coaxially with the turbine sleeve 44.

Figure 4:
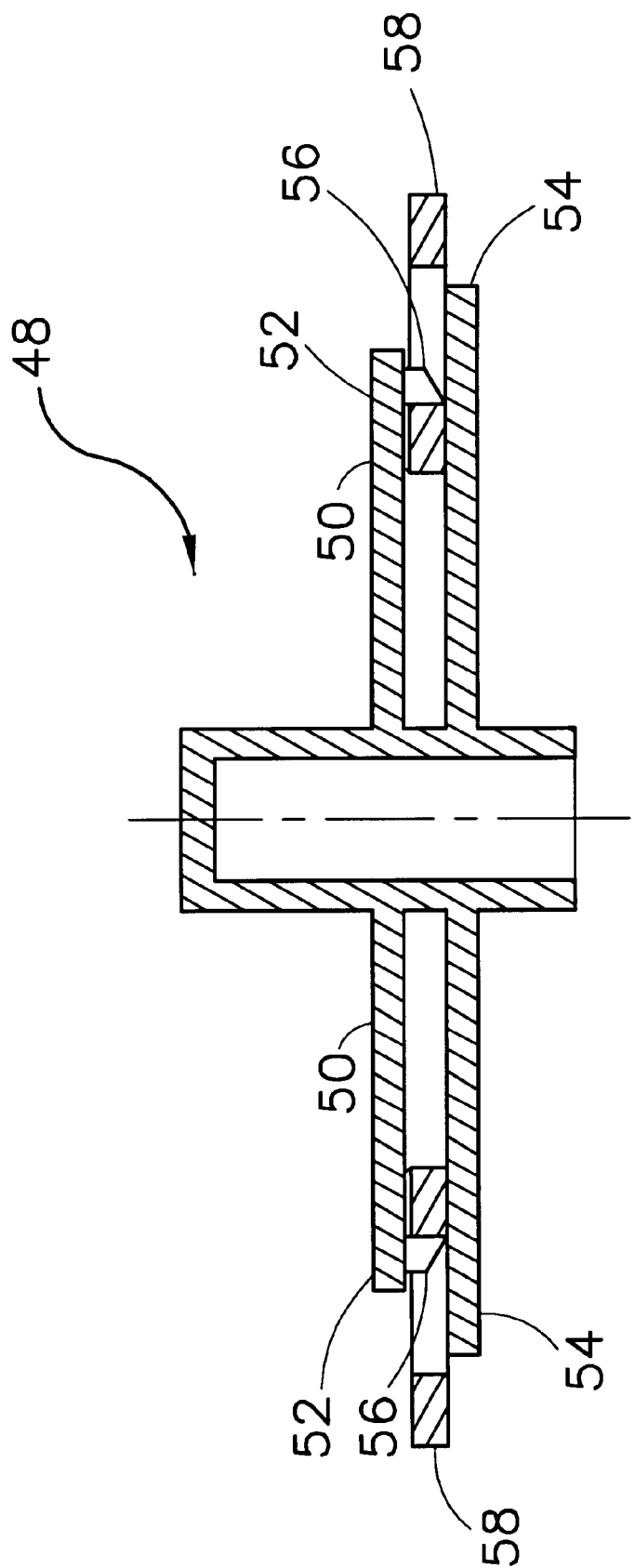
FIG. 4 illustrates a cross sectional view of a washer assembly according to the present invention.

Referring to FIG. 4, the washer assembly 48 has arm assemblies 50 extending laterally from the axis of rotation. Each arm assembly 50 has an upper member 52 and a lower member 54. Each arm assembly has a post 56 disposed between the upper and lower members 52 and 54 at a point distal from the axis of rotation. Each arm assembly further has a washer 58, which is substantially a ring structure, disposed between the upper and lower members 52 and 54 such that the post 56 passes through the center of the washer 58, securing it to the washer assembly.

Referring back to FIG. 2, the turbine assembly 40 is located such that steam communicated to the enclosed space 22 will contact the turbine 46 and cause the turbine assembly 40 to rotate. The posts 56 and washers 58 are sized such that the washers 58 can slide laterally in response to centrifugal force generated when the turbine assembly 40 rotates. Further, when the washer 58 slides laterally in response to centrifugal force it repeatedly strikes the detent 36 as the turbine assembly rotates, causing the bell to ring.

Thus, when steam is generated in the container 4 pressure will be built up. The pressurized steam is communicated to the enclosed space 22 via the vents 24 and directed to the cavity 30. The steam thus communicated contacts the turbine 46, causing the turbine assembly to rotate. As the liquid in the container 4 approaches boiling, progressively more steam and thus more pressure will be built up, causing progressively more steam to be admitted to the enclosed space 22. As a result, the turbine assembly 40 will be rotated at increasing speed as the liquid approaches boiling. When the liquid is at boiling, sufficient steam will be generated to cause the turbine assembly 40 to rotate at sufficient speed to generate sufficient centrifugal force to cause the washers 58 to slide laterally, striking the detent 36 repeatedly as the turbine assembly rotates, thus causing the bell to ring. Thus an audible notification is provided to an individual that the liquid is boiling.

It will be recognized by those familiar with the art that the invention is not limited to specific embodiment described above. Alternative embodiments are considered to be within the scope of this invention. Further, it is recognized that alternative embodiments of the bell and striking means that provide a similar function are possible.

The many features and advantages of the invention are apparent from the detailed specification, and thus, it is intended by the appended claims to cover all such features and advantages of the invention which fall within the true spirits and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. A steam driven alarm for use with an apparatus for boiling a liquid and notifying a user when the liquid boils, wherein the alarm is in communication with the apparatus for boiling a liquid such that steam from a boiling liquid is communicated to the alarm mechanism, the alarm comprising;

at least one bell and a steam driven turbine assembly disposed proximate to the at least one bell, the turbine assembly having at least one striking means and being rotatably disposed proximate to the at least one bell, such that when steam is communicated from a boiling liquid to the alarm mechanism, the turbine and striking means rotate coaxially, causing the striking means to strike the at least one bell, providing an audible notification that the liquid is boiling.

2. An alarm mechanism according to claim 1, wherein, the at least one bell has at least one detent thereon, and the turbine assembly comprises, a turbine sleeve supported on a pin or spindle defining an axis of rotation, the turbine sleeve being freely rotatable around the axis of rotation, a turbine affixed coaxially to the turbine sleeve and a striking means attached coaxially to the turbine sleeve.

3. An alarm mechanism according to claim 2, wherein, the bell has at least one vent thereon for venting steam.

4. An alarm mechanism according to claim 3, wherein the striking means is a washer assembly, the washer assembly comprising, at least one arm assembly radiating laterally from the axis of rotation of the turbine assembly, the arm assembly having a first end proximate to the axis of rotation and a second end distal from the axis of rotation, the second end having a post thereon and a washer disposed on the post such that the washer is slidable in a plane perpendicular to the axis of rotation, such that when steam is communicated to the alarm mechanism from a boiling liquid, the turbine assembly to rotates with sufficient speed such that the washer slides laterally away from the axis of rotation due to centrifugal force and strikes the at least one detent repeatedly as the turbine assembly rotates, causing the bell to ring, thus providing an audible notification that the liquid is boiling.

5. A steam driven alarm according to claim 4 wherein the turbine assembly is disposed inside a cavity defined by the underside of the bell.

6. A steam driven alarm according to claim 1 wherein the turbine assembly is disposed inside a cavity defined by the underside of the bell.

7. An apparatus for boiling a liquid and providing an audible notification when the liquid boils, the apparatus comprising, a container for holding a liquid to be boiled, the container capable of holding pressure generated by steam from a boiling liquid, and an audible steam driven alarm mechanism, the steam driven alarm comprising, at least one bell and a steam driven turbine assembly having a turbine and at least one striking means, the steam driven turbine assembly being rotatably disposed proximate to the at least one bell, means for communicating steam from the container to the turbine assembly, such that when a liquid in the container boils, pressurized steam is communicated to the turbine assembly, causing the turbine and striking means to rotate coaxially with sufficient speed, such that as the turbine rotates the at least one striking means strikes the at least one bell repeatedly, thereby providing an audible notification that the liquid in the container is boiling.

8. The apparatus according to claim 7, wherein, the at least one bell has at least one detent thereon, and the turbine assembly comprises, a turbine sleeve supported on a pin or spindle defining an axis of rotation, the turbine sleeve being freely rotatable around the axis of rotation, a turbine affixed coaxially to the turbine sleeve and a striking means attached coaxially to the turbine sleeve.

9. An apparatus according to claim 8, wherein, the bell has at least one vent thereon for venting steam.

10. The apparatus of claim 9, wherein the striking means is a washer assembly, the washer assembly comprising, at least one arm assembly radiating laterally from the axis of rotation, the arm assembly having a first end proximate to the axis of rotation and a second end distal from the axis of rotation, the second end having a post and a washer disposed on the post such that the washer is slidable in a plane perpendicular to the axis of rotation, such that when a liquid in the container boils, the turbine assembly rotates with sufficient speed that the washer slides laterally away from the axis of rotation due to centrifugal force and strikes the at least one detent repeatedly as the turbine assembly rotates, causing the bell to ring, thereby providing an audible notification that the liquid is boiling.

11. A steam driven alarm according to claim 10, wherein the turbine assembly is disposed inside a cavity defined by the underside of the bell.

12. The apparatus of claim 11, wherein the container for holding a liquid to be boiled comprises a vessel portion for holding a liquid to be boiled and a lid, the vessel portion having at least one handle and a spout for dispensing liquid.

13. The apparatus of claim 12, wherein the lid has an interior that defines an enclosed space, the lid having at least one vent for communicating pressurized steam to the enclosed space and the steam driven alarm mechanism being disposed in the enclosed space proximate to the at least one vent.

14. The apparatus of claim 13, wherein the apparatus is a kettle for boiling water.

15. A steam driven alarm according to claim 7, wherein the turbine assembly is disposed inside a cavity defined by the underside of the bell.

16. The apparatus of claim 15, wherein the container for holding a liquid to be boiled comprises a vessel portion for holding a liquid to be boiled and a lid, the vessel portion having at least one handle and a spout for dispensing liquid.

17. The apparatus of claim 7, wherein the apparatus is a kettle for boiling water.

18. A method for providing an audible notification to an individual of when a liquid in an apparatus for boiling a liquid is boiling, the method comprising;

providing a steam driven alarm in communication with an apparatus for boiling a liquid, the alarm comprising;

at least one bell and a steam driven turbine assembly disposed proximate to the at least one bell, the turbine assembly having at least one striking means and being rotatably disposed proximate to the at least one bell, such that when steam is communicated from a boiling liquid to the alarm mechanism, the turbine and striking means rotate coaxially, causing the striking means to strike the at least one bell, providing an audible notification that the liquid is boiling.

19. The method according to claim 18, wherein the apparatus for boiling a liquid is a kettle for boiling water.

* * * * *